(12) United States Patent
Beck

(10) Patent No.: US 7,715,682 B2
(45) Date of Patent: May 11, 2010

(54) FIBER DISTRIBUTION HUB HAVING AN ADJUSTABLE PLATE

(75) Inventor: Ronald A. Beck, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/397,479

(22) Filed: Mar. 4, 2009

(65) Prior Publication Data

US 2009/0226143 A1   Sep. 10, 2009

Related U.S. Application Data

(60) Provisional application No. 61/033,550, filed on Mar. 4, 2008.

(51) Int. Cl.
*G02B 6/00* (2006.01)
(52) U.S. Cl. ........................................ 385/135; 385/134
(58) Field of Classification Search ................ 385/135; 175/50
See application file for complete search history.

(56) References Cited

U.S. PATENT DOCUMENTS

| | | | |
|---|---|---|---|
| 5,717,810 A | 2/1998 | Wheeler | |
| 5,734,774 A | 3/1998 | Morrell | |
| 6,160,946 A | 12/2000 | Thompson et al. | |
| 6,535,682 B1 | 3/2003 | Puetz et al. | |
| 6,556,763 B1 | 4/2003 | Puetz et al. | |
| 6,715,719 B2 | 4/2004 | Nault et al. | |
| 6,778,752 B2 | 8/2004 | Laporte et al. | |
| 6,788,786 B1 | 9/2004 | Kessler et al. | |
| 6,792,190 B2 | 9/2004 | Xin et al. | |
| 6,792,191 B1 | 9/2004 | Clapp, Jr. et al. | |
| 6,909,833 B2 | 6/2005 | Henschel et al. | |
| 6,920,213 B2 | 7/2005 | Pershan | |
| 6,920,274 B2 | 7/2005 | Rapp et al. | |
| 6,980,725 B1 | 12/2005 | Swieconek | |
| 6,983,095 B2 | 1/2006 | Reagan et al. | |
| 7,086,539 B2 | 8/2006 | Knudsen et al. | |
| 7,088,899 B2 | 8/2006 | Reagan et al. | |
| 7,103,255 B2 | 9/2006 | Reagan et al. | |
| 7,139,461 B2 | 11/2006 | Puetz et al. | |
| 7,146,089 B2 | 12/2006 | Reagan et al. | |
| 7,149,398 B2 | 12/2006 | Solheid et al. | |
| 7,171,102 B2 | 1/2007 | Reagan et al. | |
| 7,194,181 B2 | 3/2007 | Holmberg et al. | |
| 7,198,409 B2 | 4/2007 | Smith et al. | |
| 7,200,317 B2 | 4/2007 | Reagan et al. | |
| 7,218,827 B2 | 5/2007 | Vongseng et al. | |
| 7,228,036 B2 | 6/2007 | Elkins II, et al. | |
| 7,233,731 B2 | 6/2007 | Solheid et al. | |
| 7,245,809 B1 | 7/2007 | Gniadek et al. | |
| 7,277,620 B2 | 10/2007 | Vongseng et al. | |
| 7,298,952 B2 | 11/2007 | Allen et al. | |
| 7,333,707 B2 | 2/2008 | Puetz et al. | |
| 7,340,146 B2 | 3/2008 | Lampert et al. | |
| 7,346,254 B2 | 3/2008 | Kramer et al. | |
| 7,369,741 B2 | 5/2008 | Reagan et al. | |

(Continued)

*Primary Examiner*—Ryan Lepisto
(74) *Attorney, Agent, or Firm*—Merchant & Gould P.C.

(57) ABSTRACT

A fiber distribution hub includes a cabinet having a panel with an adjustable plate disposed on the back panel. The adjustable plate is selectively moveable between a first position on the back panel and a second position on the back panel to provide space adjacent to cable openings in the cabinet.

16 Claims, 15 Drawing Sheets

U.S. PATENT DOCUMENTS

| | | | |
|---|---|---|---|
| 7,376,322 B2 | 5/2008 | Zimmel et al. | |
| 7,400,813 B2 | 7/2008 | Zimmel | |
| 7,400,816 B2 | 7/2008 | Reagan et al. | |
| 7,407,330 B2 | 8/2008 | Smith et al. | |
| 7,416,349 B2 | 8/2008 | Kramer | |
| 7,418,181 B2 | 8/2008 | Zimmel et al. | |
| 7,419,384 B2 | 9/2008 | Neumetzler et al. | |
| 7,457,503 B2 | 11/2008 | Solheid et al. | |
| 7,471,869 B2 | 12/2008 | Reagan et al. | |
| 7,515,805 B2 | 4/2009 | Vongseng et al. | |
| 7,519,259 B2 | 4/2009 | Smith et al. | |
| 2006/0110118 A1* | 5/2006 | Escoto et al. | 385/135 |
| 2006/0228086 A1* | 10/2006 | Holmberg et al. | 385/135 |
| 2007/0031100 A1 | 2/2007 | Garcia et al. | |
| 2007/0165995 A1 | 7/2007 | Reagan et al. | |
| 2007/0192817 A1* | 8/2007 | Landry et al. | 725/119 |
| 2008/0008436 A1 | 1/2008 | Reagan et al. | |
| 2008/0019644 A1 | 1/2008 | Smith et al. | |
| 2008/0019655 A1 | 1/2008 | Vongseng et al. | |
| 2008/0025684 A1 | 1/2008 | Vongseng et al. | |
| 2008/0124039 A1 | 5/2008 | Gniadek et al. | |
| 2008/0317425 A1 | 12/2008 | Smith et al. | |
| 2009/0022467 A1 | 1/2009 | Puetz et al. | |
| 2009/0074372 A1 | 3/2009 | Solheid et al. | |
| 2009/0087157 A1 | 4/2009 | Smith et al. | |
| 2009/0190896 A1 | 7/2009 | Smith et al. | |
| 2009/0196565 A1 | 8/2009 | Vongseng et al. | |

* cited by examiner

FIBER DISTRIBUTION HUB HAVING AN ADJUSTABLE PLATE

CROSS REFERENCE TO RELATED APPLICATION

This application claims the benefit of U.S. Provisional Patent Application Ser. No. 61/033,550, filed Mar. 4, 2008, which application is hereby incorporated by reference in its entirety.

BACKGROUND

Passive optical networks are becoming prevalent in part because service providers want to deliver high bandwidth communication capabilities to customers. Passive optical networks are a desirable choice for delivering high speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown in FIG. 1, the network 100 may include a central office 110 that connects a number of end subscribers 115 (also called end users 115 herein) within the network 100. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network 100 can be aerial or housed within underground conduits (e.g., see conduit 105).

A portion of the network 100 that is closest to the central office 110 is generally referred to as an F1 region, where F1 is the "feeder fiber" from the central office 110. The F1 portion of the network 100 may include a distribution cable having on the order of 12 to 48 fibers; however, alternative implementations may include fewer or more fibers. A portion of the network 100 that includes at least one of the FDHs 130 and at least one of the end users 115 may be referred to as an F2 portion of the network 100. Splitters used in the typical FDH 130 may split incoming fibers of a feeder cable into, for example, 216 to 432 individual distribution fibers that may be associated with a like number of end user 115 locations.

Referring to FIG. 1, the network 100 includes a plurality of break-out locations 125 at which branch cables 122 are separated out from main cable lines 120. The break-out locations 125 can also be referred to as tap locations, drop cable locations, splice locations or branch locations. The branch cables 122 can also be referred to as drop cables, drop lines, break-out cables or stub cables. The branch cables 122 are often connected to drop terminals 104 that include connector interfaces for facilitating coupling the fibers of the branch cables 122 to a plurality of different subscriber locations 115. The branch cables 122 can also be connected to FDHs 130.

Within the FDH 130, incoming optical fibers, from the central office 110, can be connected to outgoing optical fibers, leading to the end users 115, forming an optical signal connection. Typically, the FDH 130 includes multiple cable openings for receiving incoming fiber optic cables, each of which includes a plurality of incoming optical fibers. The multiple cable openings are often defined on multiple side panels of the FDH 130. Once the fiber optic cables are received within the FDH, the incoming fiber optic cables may be routed to splitters where each of the incoming optical fibers is split into multiple intermediate fibers. In order to protect these incoming fiber optic cables from damage (i.e., attenuation losses) as the fiber optic cables are routed from the cable openings to the splitters, space is provided adjacent to the cable openings within the FDH 130 so that the fiber optic cables can be secured to the FDH and routed from the cable openings to splitters without exceeding the minimum bend radius of the fiber optic cables. However, as cable openings are often disposed on multiple side panels of an FDH 130, the FDH 130 often includes spaces disposed adjacent to the cable openings on each of the side panels of the FDH 130. While such a configuration protects the incoming fiber optic cables from being damaged, such a configuration also makes the FDH 130 large in size. Therefore, a need exists for an FDH that provides organization and storage for incoming and intermediate fibers in a compact configuration.

SUMMARY

An aspect of the present disclosure relates to a fiber distribution hub including a cabinet having a panel with an adjustable plate disposed on the panel. The adjustable plate is adapted for selective movement relative to the panel between a first position and a second position to provide space adjacent to cable openings in the cabinet.

Another aspect of the present disclosure relates to a fiber distribution hub including a cabinet having a panel, a first panel that extends outwardly from the panel, and an oppositely disposed second panel that extends outwardly from the panel. The first panel defines a first plurality of cable openings while the second panel defines a second plurality of cable openings. An adjustable plate is disposed on the panel of the cabinet and is adapted for selective movement relative to the panel between a first position and a second position. With the adjustable plate in the first position, a first space is defined adjacent to the first plurality of cable openings. With the adjustable plate in the second position, a second space is defined adjacent to the second plurality of cable openings.

Another aspect of the present disclosure relates to a fiber distribution hub including a cabinet having a first panel, a second panel that extends outwardly from the first panel, and an oppositely disposed third panel that extends outwardly from the first panel. An interior of the cabinet is cooperatively defined by the first panel, the second panel, and the third panel. The second panel defines a first plurality of cable openings while the third panel defines a second plurality of cable openings. At least one storage module, at least one termination module, and at least one splitter module are disposed in the interior of the cabinet. An adjustable plate is disposed on the first panel and selectively moveable relative to the first panel between a first position and a second position. With the adjustable plate in the first position, a first space is defined adjacent to the first plurality of cable openings. With the adjustable plate in the second position, a second space is defined adjacent to the second plurality of cable openings.

Another aspect of the present disclosure relates to a method of installing a fiber optic cable in a fiber distribution hub. The method includes inserting a fiber optic cable through a cable opening defined by a first panel of a cabinet that extends outwardly from a second panel of the cabinet. An adjustable plate that is disposed on the second panel of the cabinet and selectively moveable relative to the second panel is moved to a first position on the second panel. The movement of the adjustable plate to the first position is in a direction away from the cable openings defined by the first panel. Optical communication between the fiber optic cable and a splitter module disposed in the cabinet is established.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Figure 1:
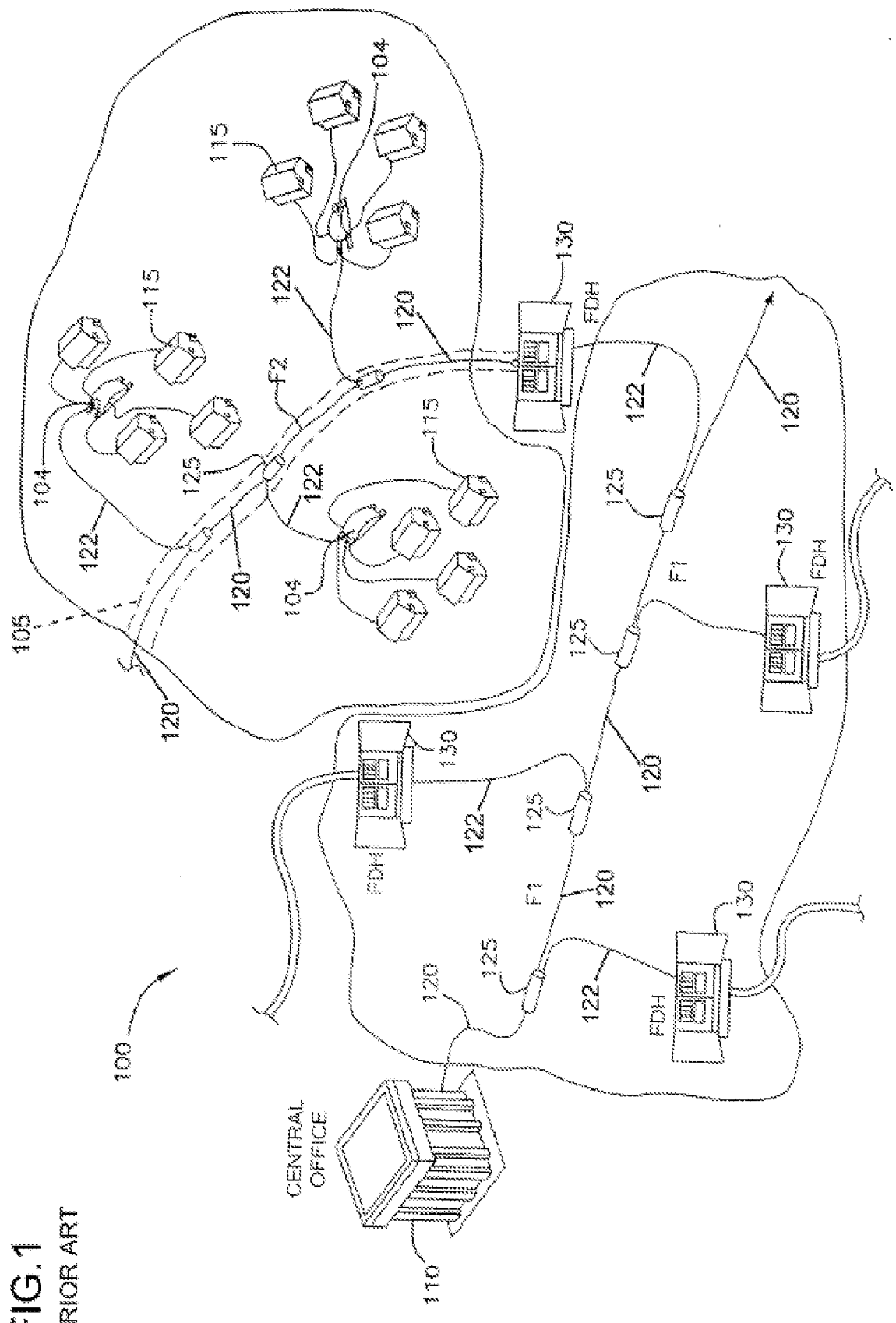
FIG. 1 is a schematic representation of a passive fiber optic network.

Reference will now be made in detail to the exemplary aspects of the present disclosure that are illustrated in the accompanying drawings. Wherever possible, the same reference numbers will be used throughout the drawings to refer to the same or like structure.

A fiber distribution hub (FDH) is typically designed to accommodate different entry points through which fiber optic cables can enter/exit the FDH. After a fiber optic cable enters the FDH through one of the entry points, the fiber optic cable is secured to the FDH near the entry/exit location. The fiber optic cable is then routed to another location within the FDH such as a location having a splitter. In order to prevent damage (i.e., attenuation losses, which are power losses caused by bending the optical fibers of the fiber optic cables beyond the minimum bend radius) to the fiber optic cable as the cable is routed from the entry point to the other location, space is provide in the FDH adjacent to the entry points. This space provides room for an installer to secure the fiber optic cable to the FDH and room for the fiber optic cables to be routed from the entry point to other locations within the FDH without exceeding the minimum bend radius of the fiber optic cable.

Typically, an FDH includes cable entry points on opposite side panels. For example, the FDH may include a set of cable entry points on the top panel and a set of cable entry points on the bottom panel of the FDH. In some instances, however, only one of the sets of cable entry points is used in the field. If only one of the sets of cable entry points is used, the FDH includes space adjacent to the other set of cable entry points that is unnecessary. However, as the manufacturer and the installer are often unaware of which cable entry points will be used until the time of installation, both spaces are provided to assure proper installation and routing of the fiber optic cable within the FDH regardless of which set of cable entry points is used.

There is a desire among fiber optic service providers to have FDHs become more compact without compromising the flexibility of the FDH to have cable entry points on multiple panels of the FDH and adequate space adjacent to those entry points for securing the fiber optic cables to the FDH and for protecting the fiber optic cables from attenuation losses. The present disclosure provides an FDH having an adjustable plate disposed on a panel from which a first panel and an oppositely disposed second panel extend outwardly. The first and second panels include first and second sets of cable openings, respectively. The adjustable plate is adapted for selective movement between a first position and a second position relative to the panel of the FDH. In the depicted embodiments of the present disclosure, the adjustable plate is slidably engaged with the panel such that the adjustable plate moves between an upper and a lower position. It will be understood, however, that the scope of the present disclosure is not limited to the adjustable plate being slidably engaged with the panel or to the adjustable plate being moveable between an upper and lower position.

The selective movement of the adjustable plate to the first position, provides a space adjacent to the first set of cable openings while selective movement of the adjustable plate to the second position provides a space adjacent to the second set of cable openings. This selective movement of the adjustable plate provides for space adjacent to the cable openings to be used in the field. As the selective movement of the adjustable plate eliminates the space adjacent to unused cable openings, the FDH is more compact.

Figure 2:
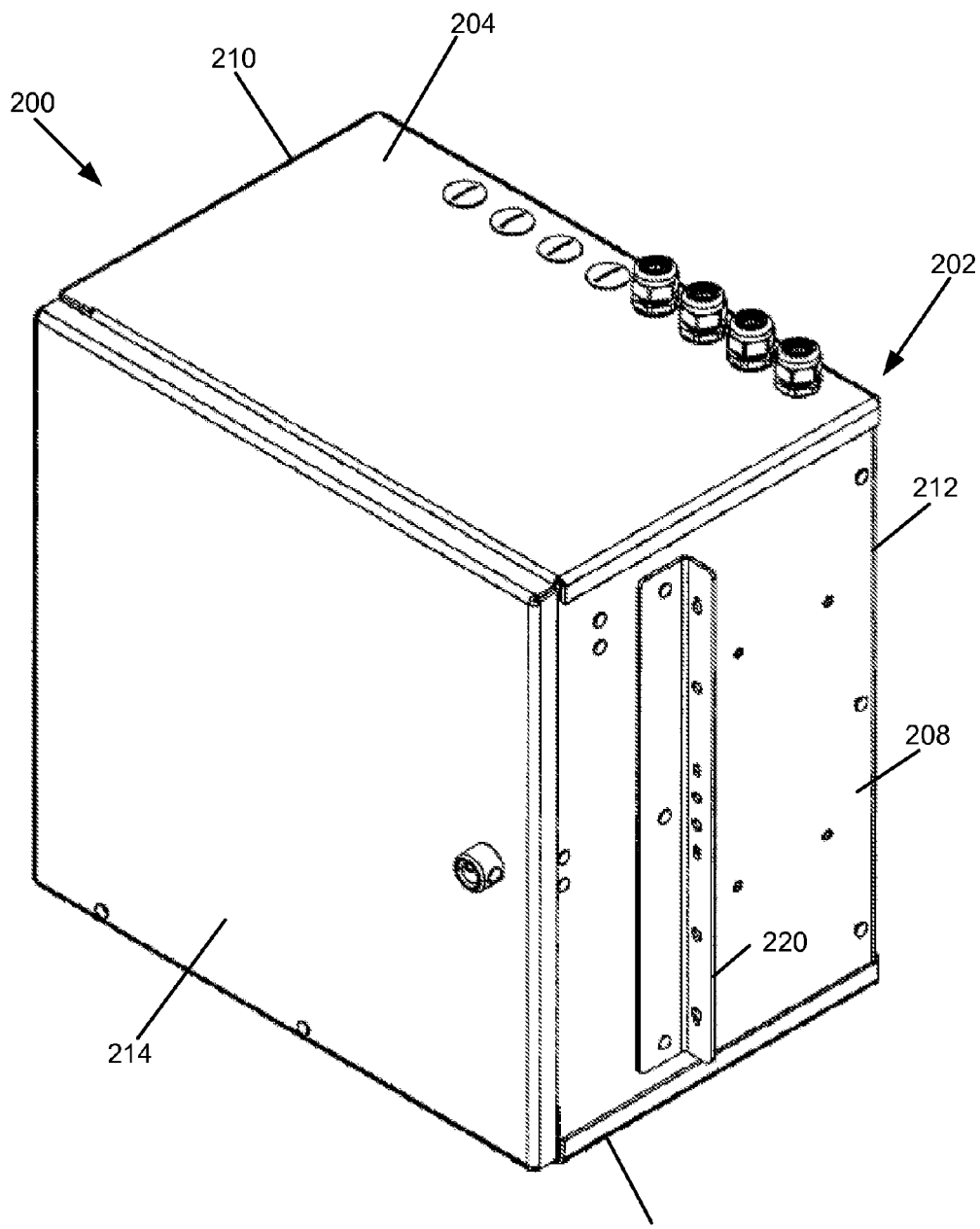
FIG. 2 is a perspective view of an exemplary fiber distribution hub having exemplary features of aspects in accordance with the principles of the present disclosure.

Referring now to FIG. 2, a fiber distribution hub (FDH), generally designated 200, is shown. The FDH 200 includes a cabinet, generally designated 202, that houses internal components. The cabinet 202 includes a back panel 212, a top panel 204 that extends outwardly from the back panel 212, a bottom panel 206 that is oppositely disposed from the top panel 204 and that extends outwardly from the back panel 212, a first side panel 208 that extends outwardly from the back panel 212, a second side panel 210 that is oppositely disposed from the first side panel 208 and that extends outwardly from the back panel 212, and at least one front door 214. In the subject embodiment, the front door 214 is pivotally mounted to the cabinet 202 by hinges 216 (shown in FIG. 4) to facilitate access to the components mounted within the cabinet 202.

In the subject embodiment, the cabinet 202 of the FDH 200 is configured to protect the internal components against rain, wind, dust, rodents, and other contaminants. However, the cabinet 202 remains relatively lightweight for easy installation, and breathable to prevent accumulation of moisture in the unit. In one embodiment, an aluminum construction with a heavy powder coat finish also provides corrosion resistance. In one embodiment, the cabinet 202 is manufactured from heavy gauge aluminum and is NEMA-4X rated. In another embodiment, alternate materials can be used.

Figure 3:
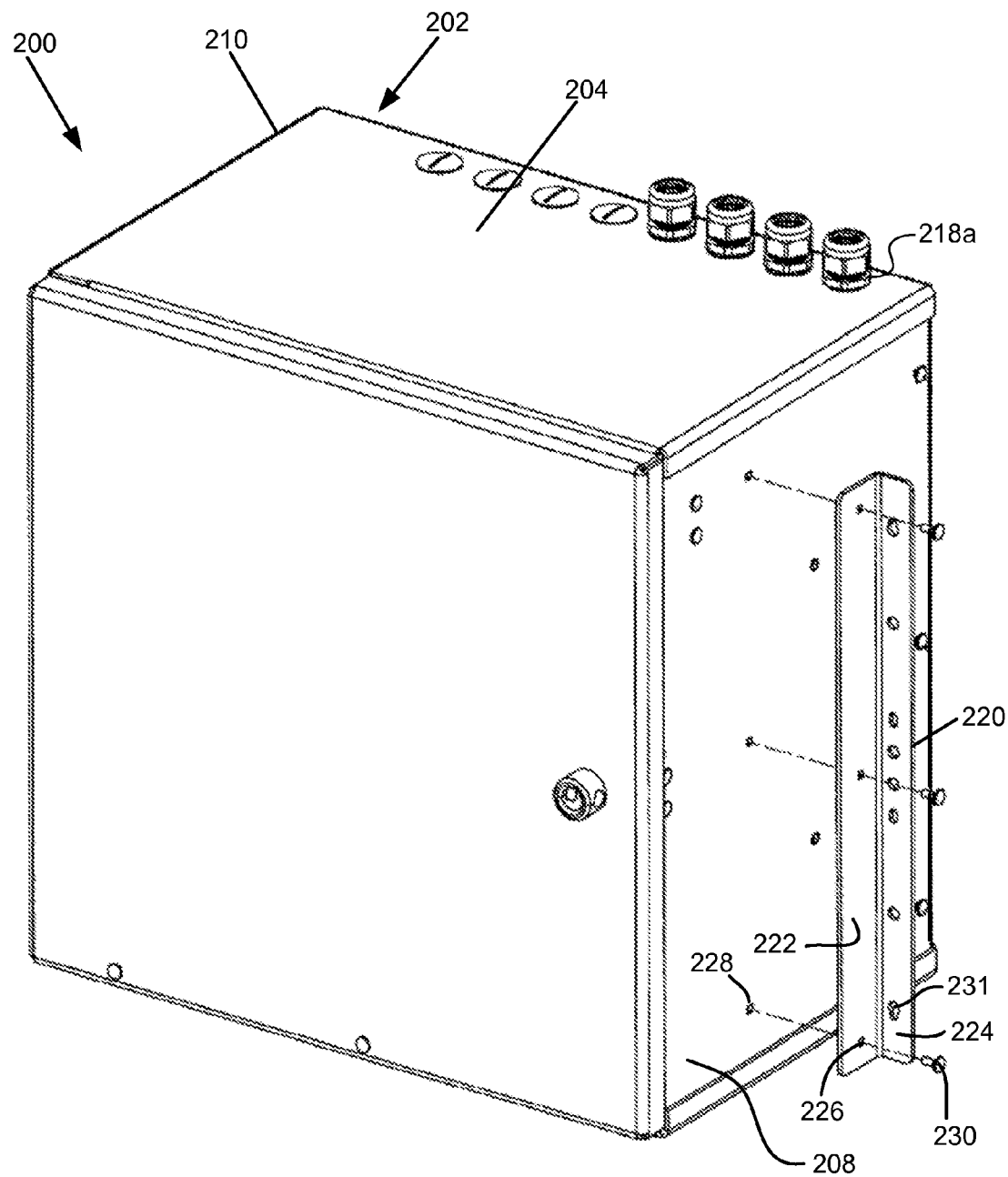
FIG. 3 is an exploded perspective view of a rack mount on the fiber distribution hub of FIG. 2.

Referring now to FIGS. 2 and 3, the FDH 200 is provided with a rack mount 220 disposed on the first and second side panels 208, 210. In the subject embodiment, the rack mount 220 is a bracket having a cabinet mount portion 222 and a rack mount portion 224. The cabinet mount portion 222 includes a plurality of through holes 226. The through holes 226 are disposed on the cabinet mount portion 222 of the rack mount 220 such that the through holes 226 may be generally aligned with rack mount holes 228 disposed on the first and second side panels 208, 210 of the cabinet 202. The through holes 226 in the cabinet mount portion 222 and the rack mount holes 228 are adapted to receive fasteners 230 (e.g., screws, bolts, rivets, etc.).

The rack mount portion 224 includes a plurality of mounting holes 231. The mounting holes 231 are adapted to receive fasteners (e.g., screws, bolts, rivets, etc.) for mounting the cabinet 202 to a rack. It will be understood, however, that while a rack mount 220 has been shown, the scope of the present disclosure is not limited to the cabinet 202 having a rack mount 220 as the cabinet 202 could include a pole mount structure or other structure.

Figure 7:
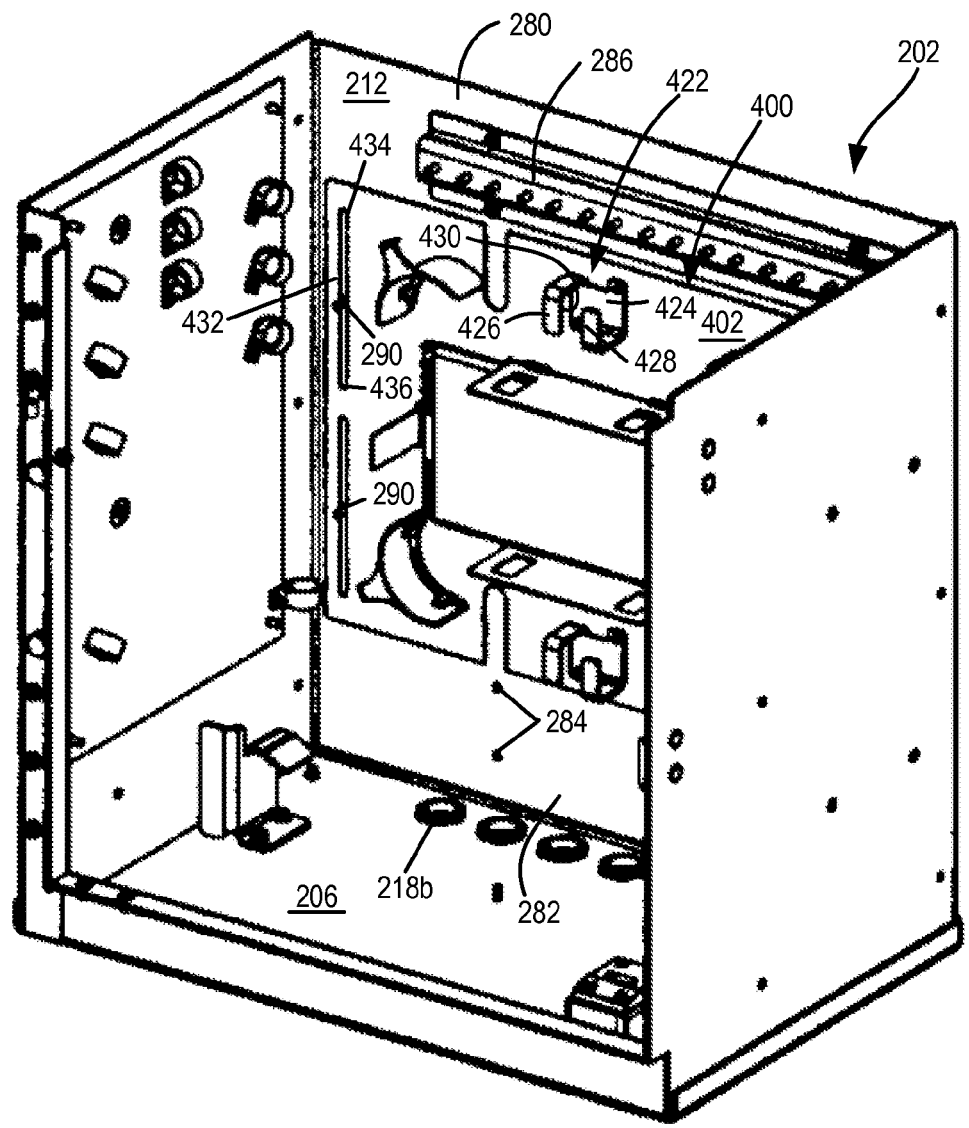
FIG. 7 is a perspective view of the fiber distribution hub of FIG. 2 with the front door, swing frame, and top panel removed.

In the subject embodiment, the top and bottom panels 204, 206 include a plurality of first and second cable openings 218a, 218b, respectively (cable openings 218b are shown in FIG. 7). The first and second cable openings 218a, 218b are paths through which cable enters and exits the cabinet 202.

Figure 4:
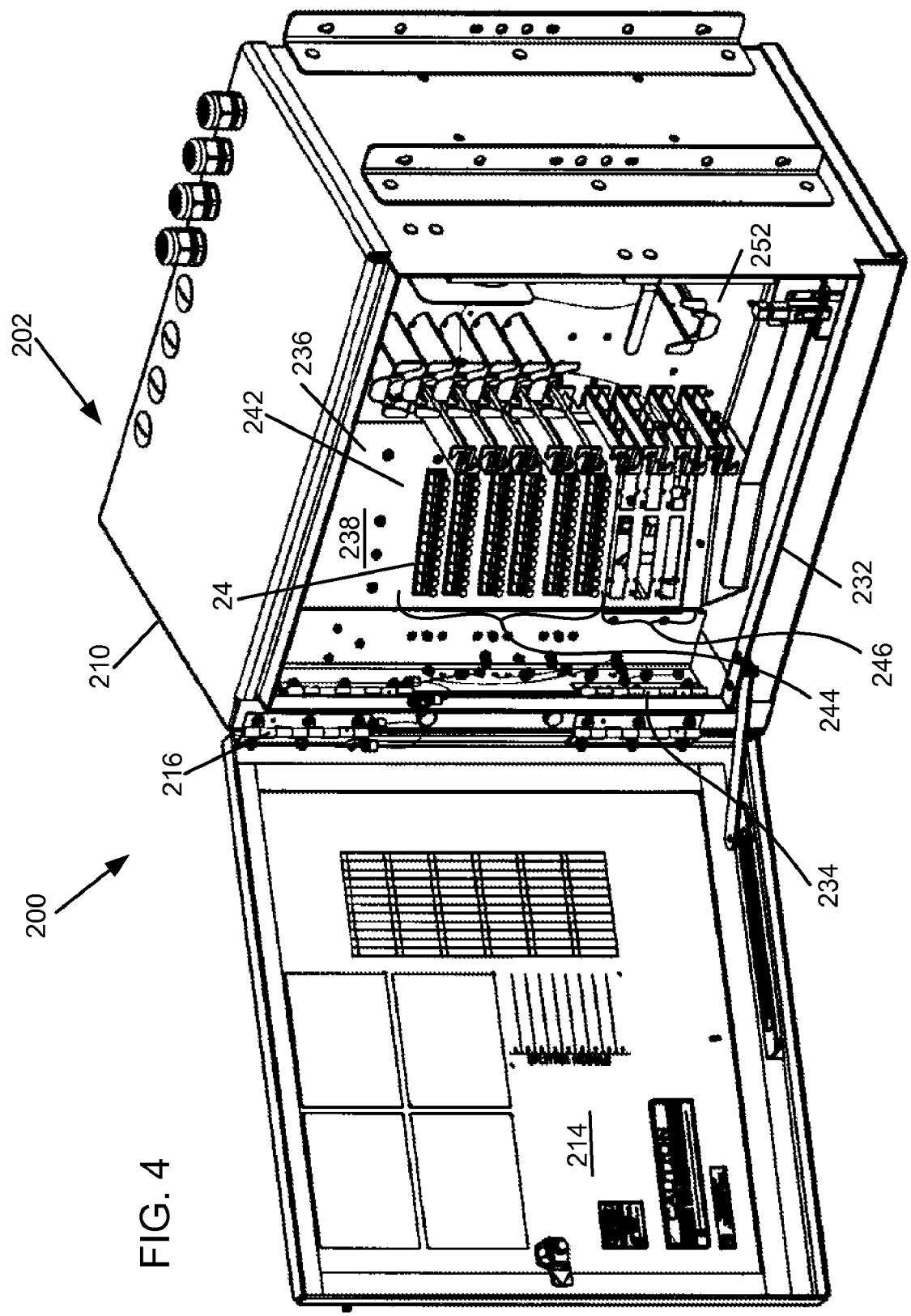
FIG. 4 is a perspective view of the fiber distribution hub of FIG. 2 having a front door in an open position.
Figure 5:
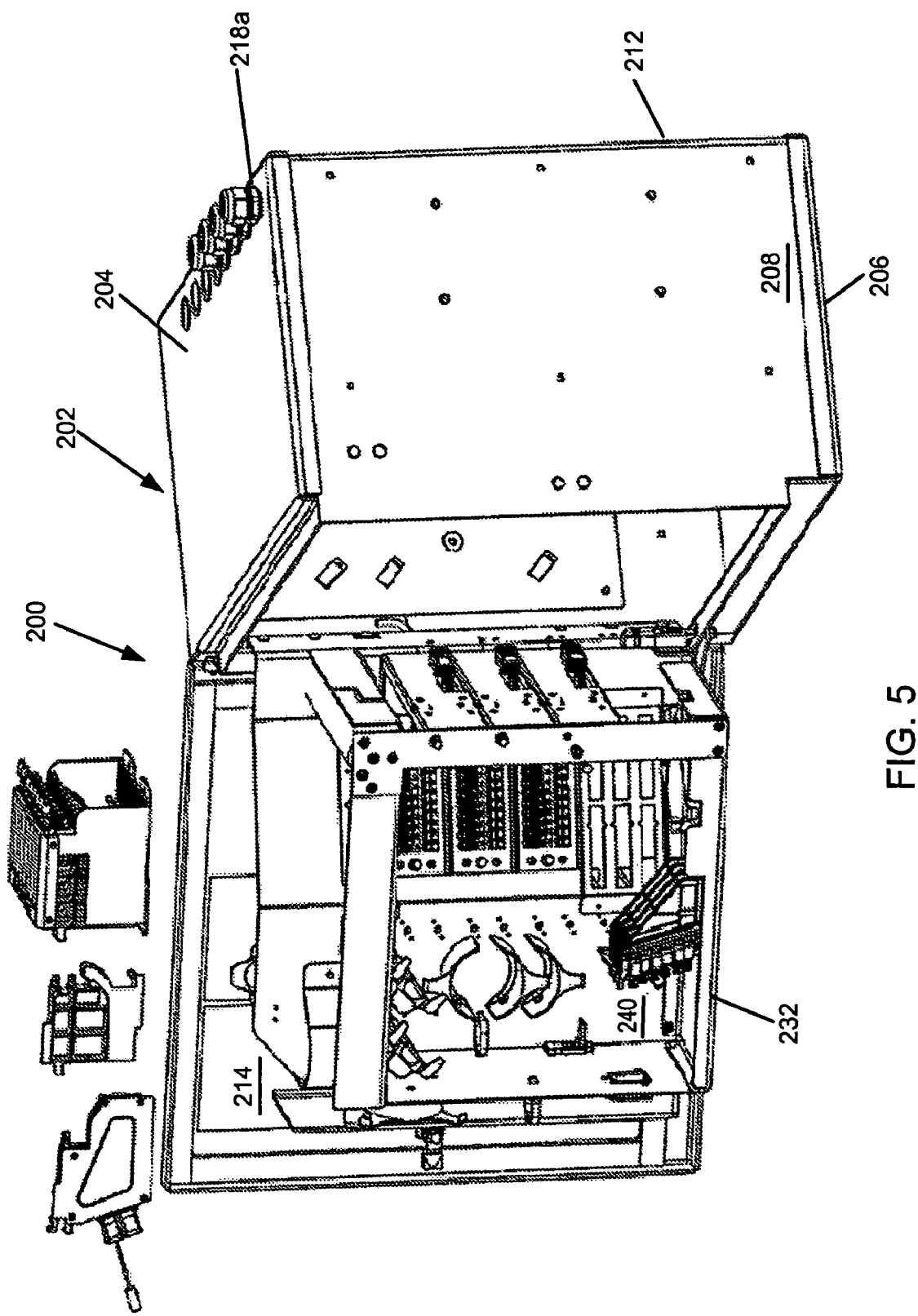
FIG. 5 is a perspective view of the fiber distribution hub of FIG. 2 having the front door and a swing frame in an open position.

Referring now to FIGS. 4 and 5, the FDH 200 is shown with the front door 214 in an open position. The FDH 200 includes a swing frame 232 disposed in an interior of the cabinet 202. In the subject embodiment, the swing frame 232 is pivotally mounted to the cabinet 202. In the subject embodiment, the swing frame 232 is mounted to the second side panel 210 by a hinge 234. The swing frame 232 pivots about the hinge 234 between a closed position, shown in FIG. 4, and an open position, shown in FIG. 5.

The swing frame 232 includes a bulkhead 236 that divides the swing frame 232 into a front portion 238 (shown in FIG. 4) and a rear portion 240 (shown in FIG. 5). The bulkhead 236 includes a main panel 242 having a termination region 244 and a storage region 246. Generally, at least one termination module 248 is provided at the termination region 244 and at least one storage module 250 (shown schematically in FIG. 6) is provided at the storage region 246. In some embodiments, the bulkhead 236 also includes a secondary panel 252 (shown in FIG. 4) positioned adjacent the main panel 242 and configured for cable management. One or more feeder cable interfaces 254 (shown schematically in FIG. 6) can be positioned within the rear portion 240 of the swing frame 232. At least one splitter module housing 256 (shown schematically in FIG. 6) accommodating one or more splitter modules 258 (shown in schematically FIG. 6) is positioned at the top of the swing frame 232.

When the swing frame 232 is in the closed position, components disposed on the front portion 238 of the swing frame 232 are accessible. When the swing frame 232 is in the open position, components disposed on the rear portion 240 of the swing frame 232 are accessible.

Figure 6:
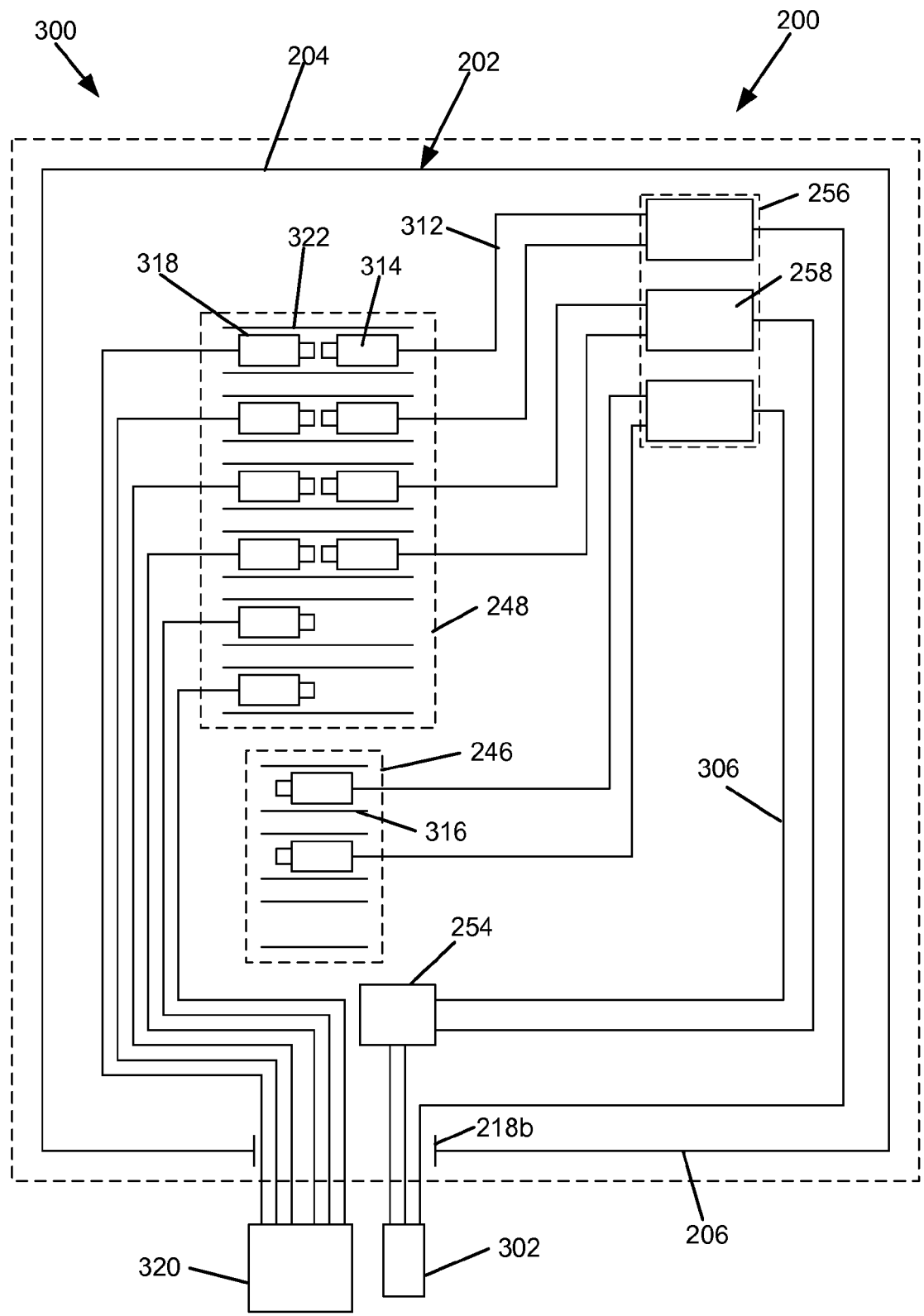
FIG. 6 is a schematic representation of an exemplary cable routing scheme for the fiber distribution hub of FIG. 2.

Referring now to FIG. 6, a schematic representation of an exemplary cable routing scheme 300 for the FDH 200 is shown. A feeder cable 302 is initially routed into the FDH 200 through the first and second cable openings 218a, 218b in the top or bottom panels 204, 206 of the cabinet 202. In certain embodiments, the fibers of the feeder cable 302 can include ribbon fibers. An example feeder cable 302 may include twelve to forty-eight individual fibers connected to a service provider central office 110. In some embodiments, after entering the cabinet 202, the fibers of the feeder cable 302 are routed to the feeder cable interface 254 (e.g., fiber optic adapter modules, a splice tray, etc.). At the feeder cable interface 254, one or more of the fibers of the feeder cable 302 are individually connected to separate splitter input fibers 306. The splitter input fibers 306 are routed from the feeder cable interface 254 to the splitter module housing 256. At the splitter module housing 256, the splitter input fibers 306 are connected to separate splitter modules 258, wherein the splitter input fibers 306 are each split into multiple pigtails 312, each having connectorized ends 314. In other embodiments, however, the fibers of the feeder cable 302 can be connectorized and can be routed directly to the splitter modules 258 thereby bypassing or eliminating the need for an intermediate feeder cable interface 254.

When the pigtails 312 are not in service, the connectorized ends 314 can be temporarily stored on a storage module 316 that is mounted at the storage region 246 of the swing frame 232. When the pigtails 312 are needed for service, the pigtails 312 are routed from the splitter modules 258 to the termination module 248 that is provided at the termination region 244 of the swing frame 232. At the termination module 248, the connectorized ends 314 of the pigtails 312 are connected to connectorized ends 318 of fibers of a distribution cable 320 within an adapter 322. The termination region 244 is the dividing line between the incoming fibers and the outgoing fibers. A typical distribution cable 320 forms the F2 portion of the network 100 (shown in FIG. 1) and typically includes a plurality of fibers (e.g., 144, 216, or 432 fibers) that are routed from the FDH 200 to end user 115 locations.

Further exemplary embodiments of fiber distribution hubs are provided in U.S. Patent Application Ser. Nos. 60/990,609, filed on Nov. 27, 2007, and 11/544,951, filed on Oct. 6, 2006, both of which are hereby incorporated by reference in their entirety.

Referring now to FIG. 7, the cabinet 202 is shown with the front door 214, the swing frame 232 and the top panel 204 removed for ease of illustration. In the subject embodiment, the back panel 212 includes a first bracket mounting location 280 disposed near the top panel 204 of the cabinet 202 and a second bracket mounting location 282 disposed near the bottom panel 206 of the cabinet 202. The first and second cable bracket mounting locations 280, 282 include a plurality of mounting holes 284 that are adapted to receive bracket mounts of a cable bracket 286 for securing cable that enters the interior of the cabinet 202. The first and second bracket mounting locations 280, 282 are disposed adjacent to the first and second cable openings 218a, 218b, respectively, in the top and bottom panels 204, 206. If the first cable openings 218a are being used for cable to enter and exit the cabinet 202, the cable bracket 286 is mounted to the first bracket mounting location 280 while the mounting holes 284 in the second bracket mounting location 282 are plugged to protect the interior of the cabinet 202 from environmental elements (e.g., dust, wind, rain, ice, etc.). If the second cable openings 218b are being used for cable to enter and exit the cabinet 202, the cable bracket 286 is mounted to the second bracket mounting location 282 while the mounting holes 284 in the first bracket mounting location 280 are plugged to protect the interior of the cabinet 202 from environmental elements.

The back panel 212 further includes a plurality of pins 290 that extend outwardly from the back panel 212 into the interior of the cabinet 202. In the subject embodiment, and by way of example only, there are four pins 290 that extend outwardly from the back panel 212 and into the interior of the cabinet 202. The pins 290 are threaded and adapted to receive a retention member (e.g., nut, etc.). It will be understood, however, that the scope of the present disclosure is not limited to the pins 290 being threaded.

Figure 8:
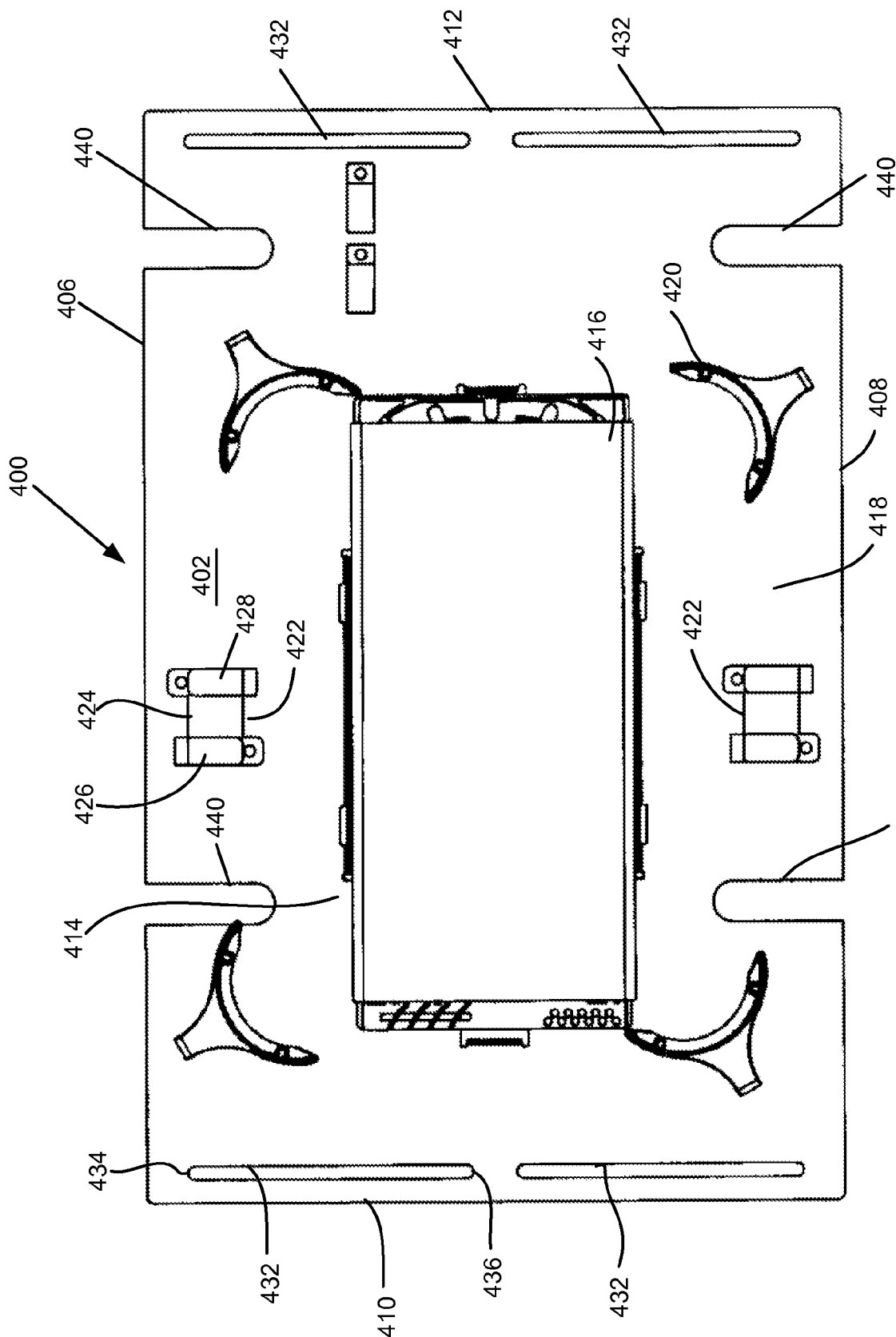
FIG. 8 is a front view of an exemplary adjustable plate suitable for use in the fiber distribution hub of FIG. 2 and having exemplary features of aspects in accordance with the principles of the present disclosure.
Figure 9:
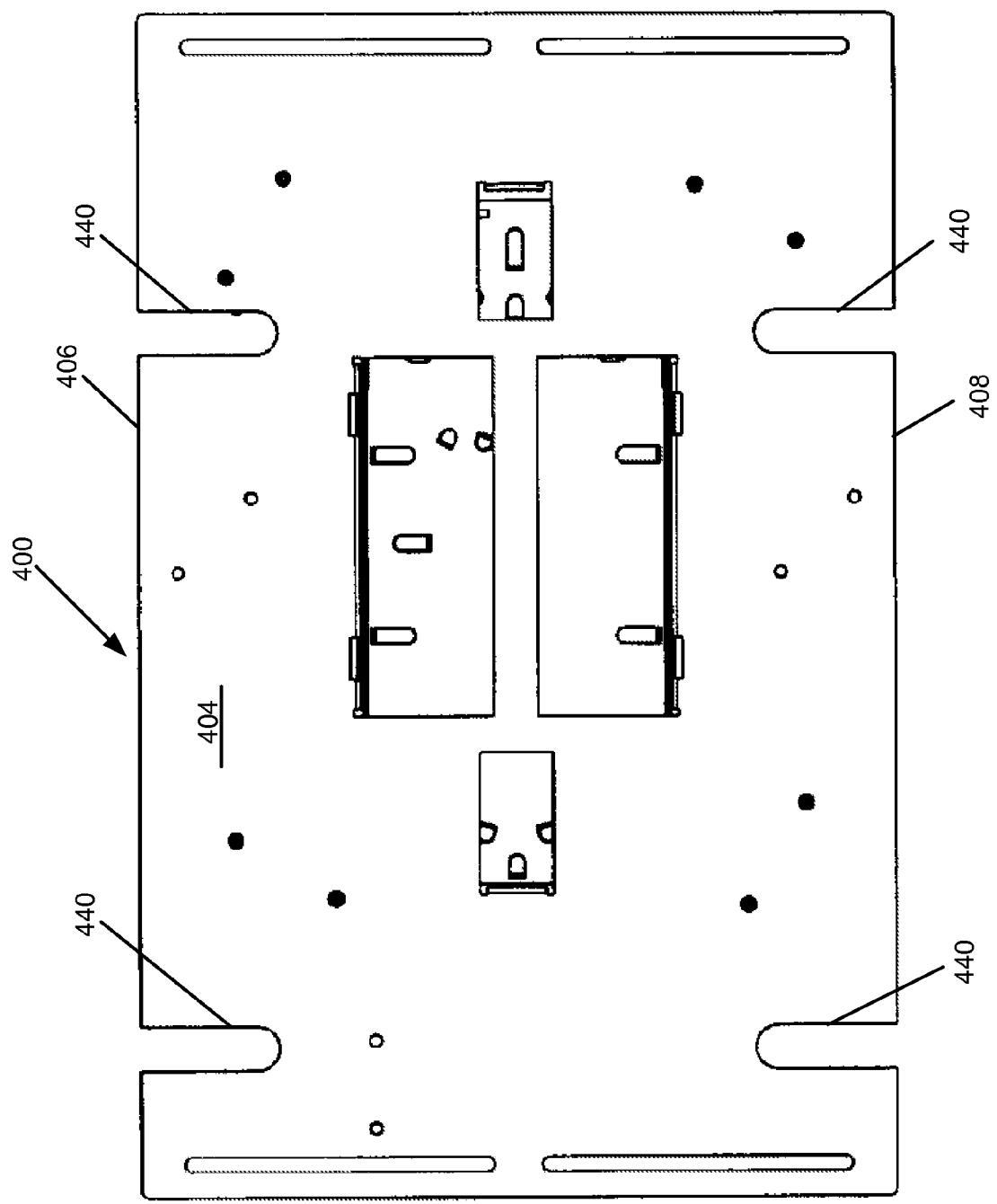
FIG. 9 is a rear view of the adjustable plate of FIG. 8.

Referring now to FIGS. 7-9, with the front door 214 and the swing frame 232 of the cabinet 202 in the open position (FIG. 5), an adjustable plate, generally designated 400, which is disposed adjacent to the back panel 212 in the interior of the cabinet 202, is accessible. The adjustable plate 400 includes a front surface 402 and a rear surface 404.

In the subject embodiment, the adjustable plate 400 is generally rectangular in shape. It will be understood, however, that the scope of the present disclosure is not limited to the adjustable plate 400 being generally rectangular in shape. The adjustable plate 400 includes an upper end 406, an oppositely disposed lower end 408, a first side end 410, and an oppositely disposed second side end 412.

In one embodiment, the front surface 402 of the adjustable plate 400 includes a splice tray mounting area 414. In the subject embodiment, a splice tray 416 is shown mounted in the splice tray mounting area 414. The front surface 402 of the adjustable plate 400 further includes a cable management area 418. Disposed within the cable management area 418 are a plurality of bend radius protectors 420 and a plurality of cable holders 422 (best shown in FIG. 7). In the subject embodiment, and by way of example only, there are four bend radius protectors 420 with each bend radius protector 420 being disposed adjacent to a corner of the splice tray 416. Each of the bend radius protectors 420 includes a radius that is sized to be larger than the minimum bend radius of an optical fiber.

In the subject embodiment, and by way of example only, there are two cable holders 422 with one cable holder 422 disposed adjacent to the upper end of the adjustable plate 400 and the other cable holder 422 disposed adjacent to the lower end of the adjustable plate 400. Each of the cable holders 422 includes a base 424, a first hook protrusion 426 that extends outwardly from the base 424, and an oppositely disposed second hook protrusion 428 that extends outwardly from the base 424. The first and second hook protrusions 426, 428 define a channel 430 (shown in FIG. 7) through which the optical fibers pass. In the subject embodiment, the cable holders 422 loosely retain the optical fibers in the cable management area 418.

Figure 10:
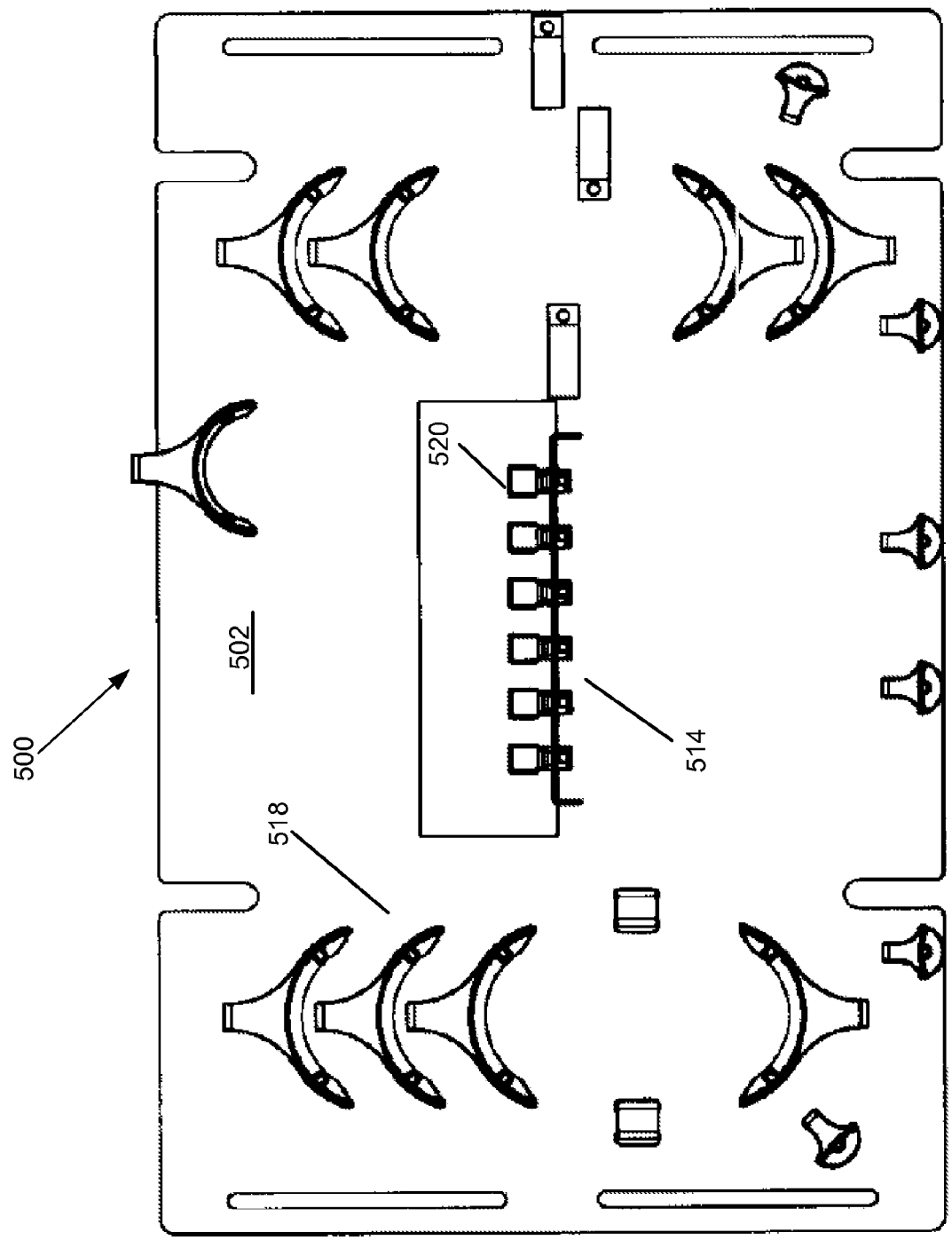
FIG. 10 is a front of an alternate embodiment of a plate suitable for use in the fiber distribution hub of FIG. 2.
Figure 11:
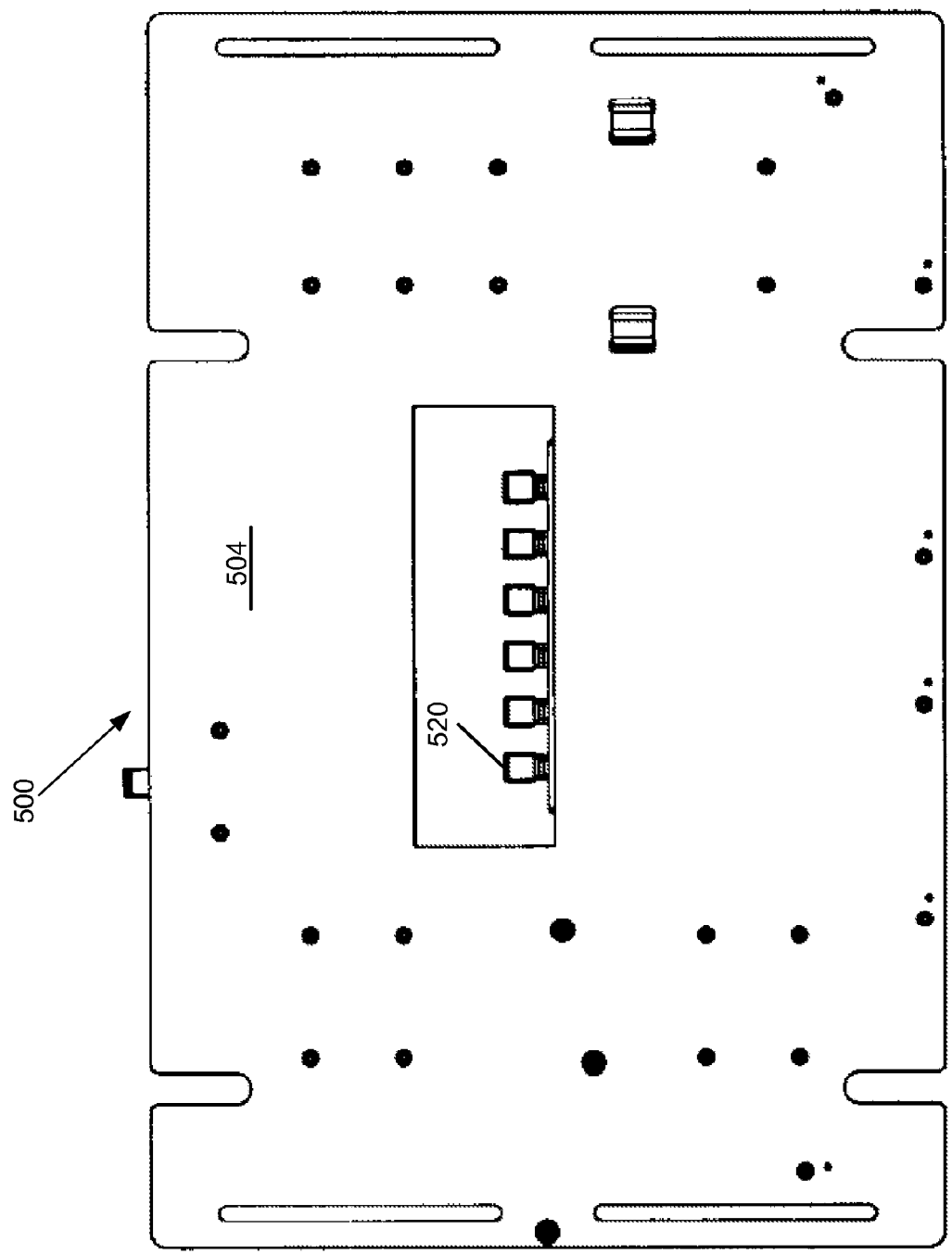
FIG. 11 is a rear view of the plate of FIG. 10.

Referring now to FIGS. 10 and 11, an alternate embodiment of a plate 500 is shown. The plate 500 includes a front side 502 and a rear side 504. The front side of the plate 500 includes termination area 514 and a cable management area 518. In the subject embodiment, the termination area 514 includes a plurality of fiber optic adapters 520 having first sides and opposite second sides. In one embodiment, the first sides of the plurality of fiber optic adapters 512 are adapted to receive connectorized ends of fibers of the feeder cable 302 (shown schematically in FIG. 6). The second sides of the fiber optic adapters 512 are adapted to receive connectorized ends of the splitter input fibers 306 (shown schematically in FIG. 6).

Referring again to FIGS. 7-9, the adjustable plate 400 includes slots 432 disposed adjacent to each of the first and second side ends 410, 412. It will be understood, however, that the scope of the present disclosure is not limited to slots 432 being disposed adjacent to each of the first and second side ends 410, 412, as slots 432 or holes could be disposed at other locations on the adjustable plate 400. In the subject embodiment, and by way of example only, there are two slots 432 disposed adjacent to the first side end 410 and two slots disposed adjacent to the second side end 412. Each of the slots 432 extends through the adjustable plate 400.

Each of the slots 432 includes a first end 434 and an oppositely disposed second end 436. In the depicted embodiment, the first end 434 of each of the slots 432 is an upper end 434 while the second end 436 is a lower end 436. It will be understood, however, that the scope of the present disclosure is not limited to the first end 434 being an upper end or to the second end 436 being a lower end.

In the subject embodiment, and by way of example only, each slot 432 is at least about 3 inches in length, about 4 inches in length, about 5 inches in length, about 6 inches in length, about 7 inches in length, about 8 inches in length, about 9 inches in length, about 10 inches in length, or about 12 inches in length. In another embodiment, and by way of example only, each slot 432 is in a range of about 5 to about 8 inches in length or about 6 to about 7 inches in length.

Each slot 432 is adapted to receive one pin 290 that extends outwardly from the back panel 212. In the subject embodiment, the engagement between the slots 432 of the adjustable plate 400 and the pins 290 of the back panel 212 is selective sliding engagement.

Referring now to FIGS. 7 and 12-15, the selective movement of the adjustable plate 400 will be described. While the adjustable plate 400 of the cabinet 202 has been and will be further described as being selectively moveable between an upper and lower position, it will be understood that the scope of the present disclosure is not limited to the adjustable plate 400 being selectively moveable between an upper and lower position as the adjustable plate 400 could also be moved between a front and back position or a left and right position. In the subject embodiment, the adjustable plate 400 slides relative to the back panel 212 of the cabinet 202 such that the adjustable plate 400 is selectively moveable between a first position and a second position.

In FIG. 7, the adjustable plate 400 is shown in a central position. In the central position, each pin 290 is disposed centrally between the upper end 434 and the lower end 436 of the respective slot 432.

Figure 12:
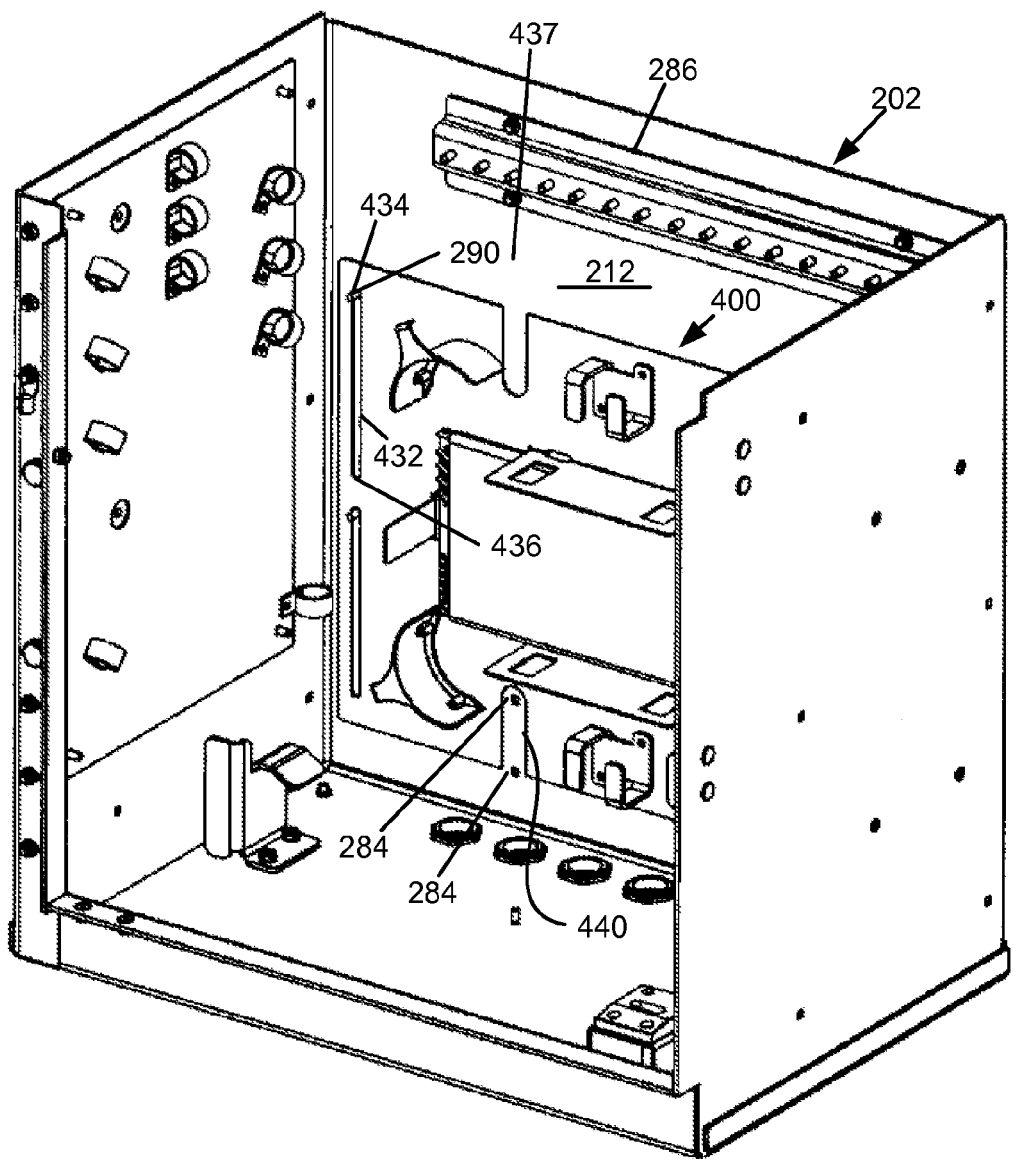
FIG. 12 is a perspective view of the fiber distribution hub of FIG. 7 with the adjustable plate in a first position.
Figure 13:
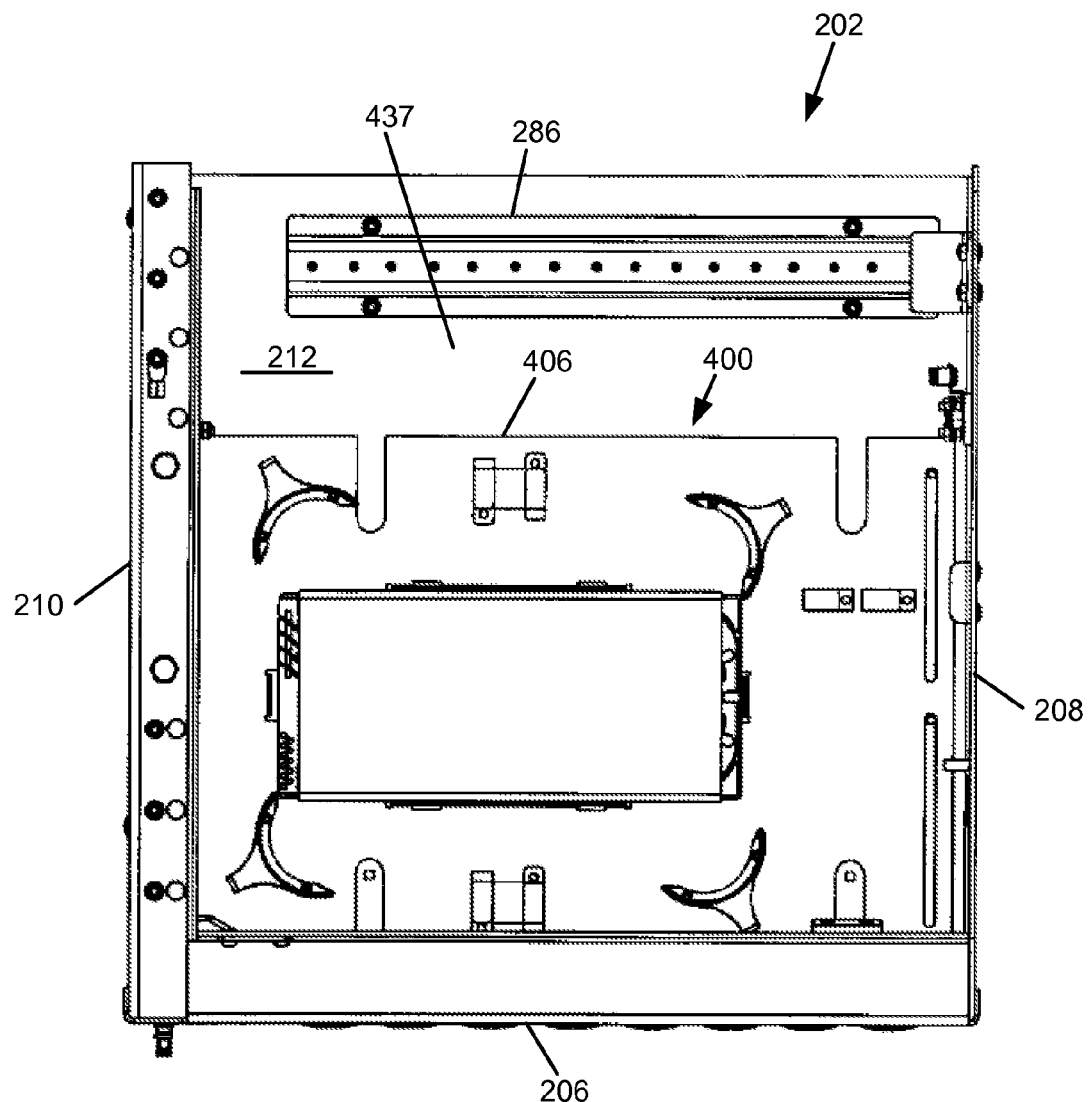
FIG. 13 is a front view of the fiber distribution hub of FIG. 12.

In FIGS. 12 and 13, the adjustable plate 400 is shown in the first position. In the subject embodiment, the first position is a lower position. In the first position, each pin 290 is disposed adjacent to the upper end 434 of the respective slot 432. With the adjustable plate 400 in the first position, a first space 437 is provided above the upper end 406 of the adjustable plate 400 in which the cable entering the first cable openings 218a can be mechanically secured (e.g., via the cable bracket 286 disposed in the first bracket mounting location 280), in which the cable entering the first cable openings 218a can be routed to another location within the cabinet 202 using a proper bend radius, and/or in which individual optical fibers in the fiber optic cable can be fanned out or separated from the other optical fibers of the fiber optic cable.

Figure 14:
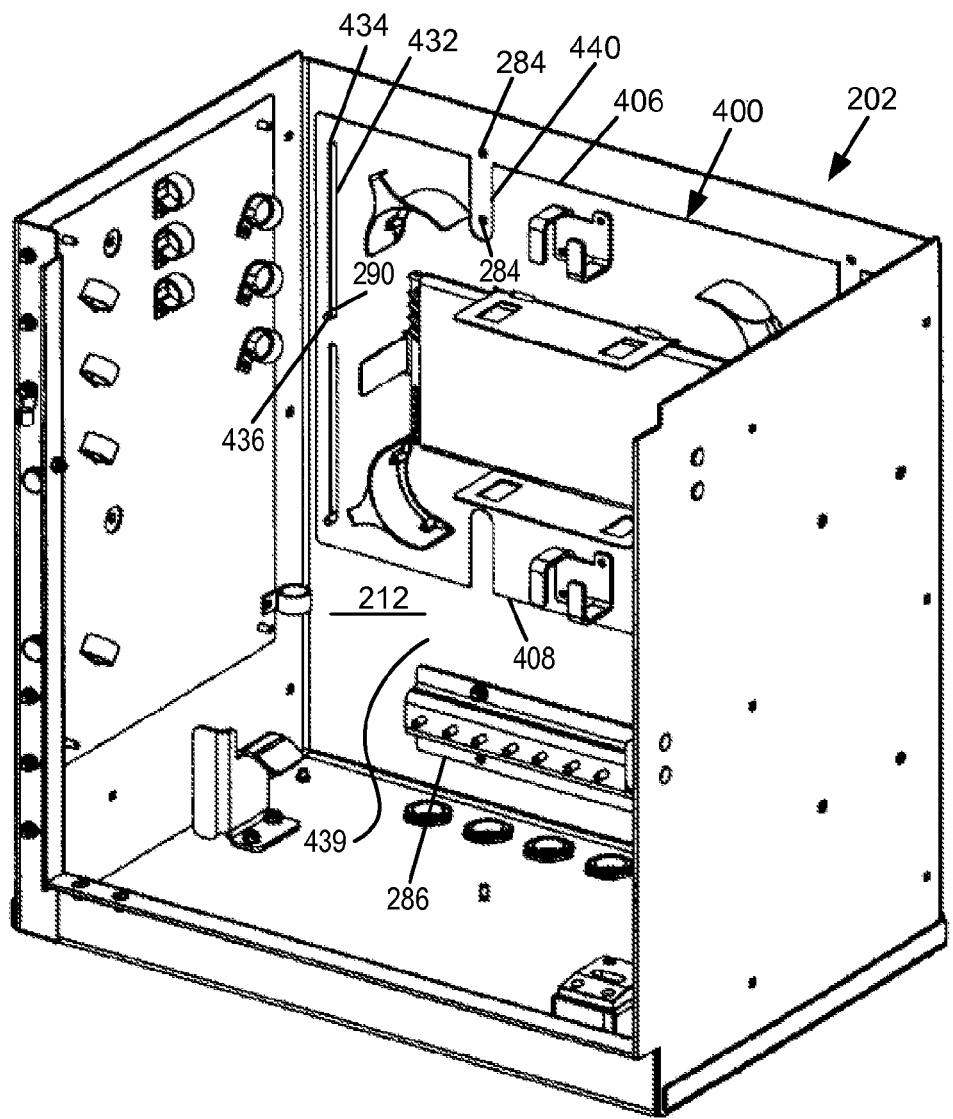
FIG. 14 is a perspective view of the fiber distribution hub of FIG. 7 with the adjustable plate in a second position.
Figure 15:
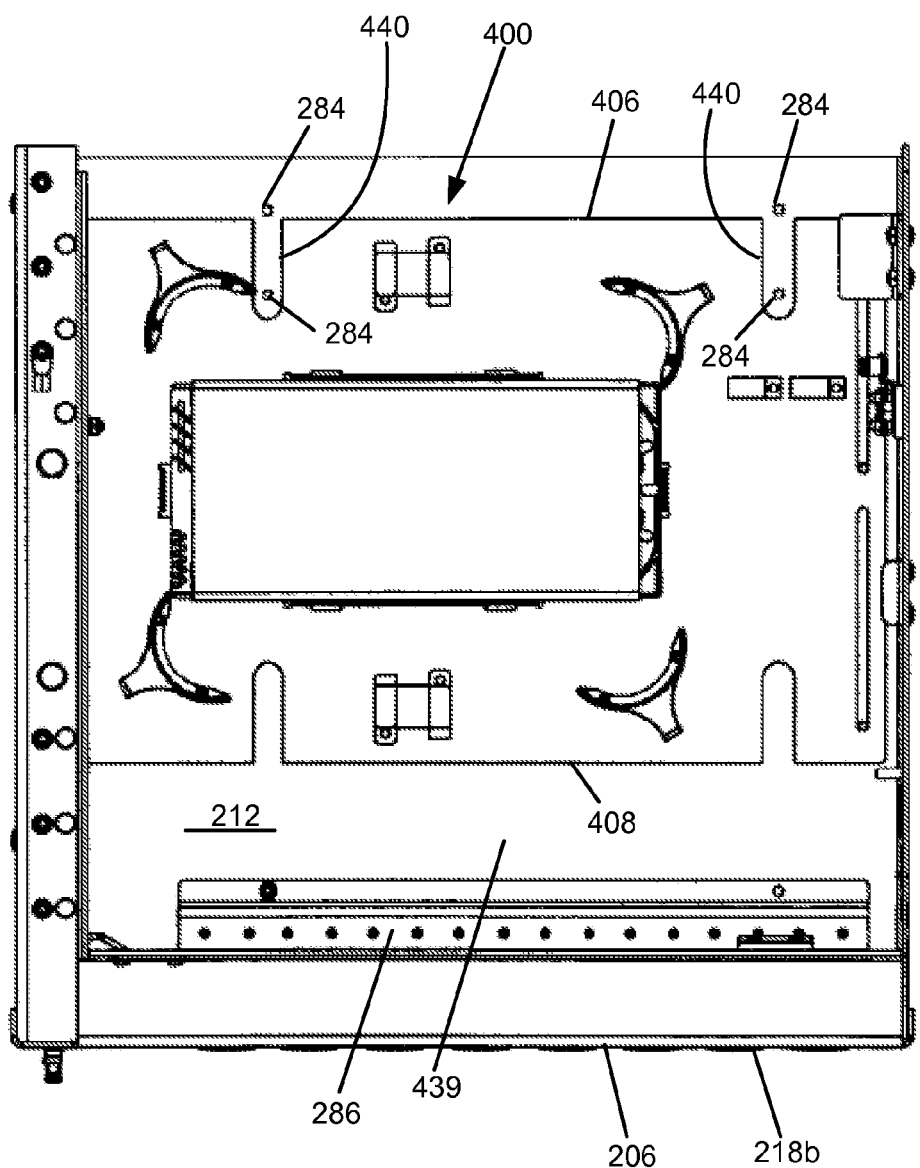
FIG. 15 is a front view of the fiber distribution hub of FIG. 14.

In FIGS. 14 and 15, the adjustable plate 400 is shown in the second position. In the subject embodiment, the second position is an upper position. In the second position, each pin 290 is disposed adjacent to the lower end 436 of the respective slot 432 in the adjustable plate 400. With the adjustable plate 400 in the second position, a second space 439 is provided below the lower end 408 of the adjustable plate 400 in which cable entering the second cable openings 218b can be mechanically secured, in which the cable entering the second cable openings 218b can be routed to another location within the cabinet 202 using a proper bend radius, and/or in which individual optical fibers can be fanned out from the other optical fibers of the fiber optic cable.

Referring now to FIGS. 6-15, a method for installing fiber optic cable 302 in the fiber distribution hub 200 will be described. If the fiber optic cable 302 is to be inserted into the cabinet 202 through the cable openings 218a disposed on the top panel 204, the adjustable plate 400 is moved from either the central position or the first position to the second position. In one embodiment, the retention members, which are in tight engagement with the pins 290, are loosened so that the adjustable plate 400 can move to the second position. With the adjustable plate 400 in the second position, the adjustable plate 400 is secured to the back panel 212 by tightening the retention members on the pins 290. The fiber optic cable 302 is inserted into the cabinet 202 through the cable openings 218a in the top panel, which is adjacent to the back panel 212. As the direction of movement of the adjustable plate 400 as the adjustable plate 400 is moved to the second position is away from the cable openings 218a, adequate space is provided for the fiber optic cable 302 to enter the cabinet 202. In one embodiment, the direction of movement of the adjustable plate is in a direction that is generally parallel with an axis of one of the cable openings 218a through which the fiber optic cable 302 is to be inserted. It will be understood, however, that the scope of the present disclosure is not limited to the direction of movement of the adjustable plate being generally parallel to an axis of one of the cable openings 218a through which the fiber optic cable 302 is to be inserted.

In one embodiment, the fiber optic cable 302 can be secured to the back panel 212 through the cable bracket 286 mounted in the first bracket mounting location 280 on the back panel 212. With the cable bracket 286 mounted in the first bracket mounting location 280 on the back panel 212, the mounting holes 284 associated with the second bracket mounting location 282 can be plugged. In the depicted embodiment of FIGS. 7-15, the adjustable plate 400 includes a plurality of openings 440 for providing clearance between the adjustable plate 400 and the plugged mounting holes 284. In the subject embodiment, and by way of example only, the openings 440 are "U-shaped" openings 440 that extend through the adjustable plate 400 at the upper end 406 and the lower end 408. The openings 440 are sized to provide clearance between the adjustable plate 400 and the plugged mounting holes 284 of the first bracket mounting location 280 or the second bracket mounting location 282 when the adjustable plate 400 is in the first position or second position, respectively.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber distribution hub comprising:
   a cabinet having a first panel, a second panel that extends outwardly from the first panel, and an oppositely disposed third panel that extends outwardly from the first panel, wherein the second panel defines a first plurality of cable openings and the third panel defines a second plurality of cable openings; and
   an adjustable plate disposed on the first panel and being adapted for selective movement relative to the first panel between a first position and a second position, wherein a first space is defined adjacent to the first plurality of cable openings with the adjustable plate in the first position and a second space is defined adjacent to the second plurality of openings with the adjustable plate in the second position, the adjustable plate including a plurality of slots adapted for sliding engagement with the first panel of the cabinet.

2. A fiber distribution hub as claimed in claim 1, further comprising a cable bracket mounted to the first panel adjacent to one of the second and third panels.

3. A fiber distribution hub comprising:
   a cabinet having a first panel, a second panel that extends outwardly from the first panel, and an oppositely disposed third panel that extends outwardly from the first panel, wherein the second panel defines a first plurality of cable openings and the third panel defines a second plurality of cable openings; and
   an adjustable plate disposed on the first panel and being adapted for selective movement relative to the first panel between a first position and a second position, wherein a first space is defined adjacent to the first plurality of cable openings with the adjustable plate in the first position and a second space is defined adjacent to the second plurality of openings with the adjustable plate in the second position, the adjustable plate including a splice tray mounting area.

4. A fiber distribution hub as claimed in claim 3, further comprising a splice tray mounted to the adjustable plate at the splice tray mounting area.

5. A fiber distribution hub comprising
   a cabinet having a first panel, a second panel that extends outwardly from the first panel, and an oppositely disposed third panel that extends outwardly from the first panel, wherein the second panel defines a first plurality of cable openings and the third panel defines a second plurality of cable openings;
   an adjustable plate disposed on the first panel and being adapted for selective movement relative to the first panel between a first position and a second position, wherein a first space is defined adjacent to the first plurality of cable openings with the adjustable plate in the first position and a second space is defined adjacent to the second plurality of openings with the adjustable plate in the second position, the adjustable plate including a cable management area; and
   a plurality of bend radius protectors disposed on the adjustable plate in the cable management area.

6. A fiber distribution hub comprising:
   a cabinet having a first panel, a second panel that extends outwardly from the first panel, and an oppositely dispose third panel that extends outwardly from the first panel, the first panel, the second panel, and the third panel cooperatively defining an interior of the cabinet, wherein the second panel defines a first plurality of cable openings and the third panel defines a second plurality of cable openings;
   at least one storage module disposed in the interior of the cabinet;
   at least one termination module disposed in the interior of the cabinet;
   at least one splitter module disposed in the interior of the cabinet; and
   an adjustable plate disposed on the first panel and selectively moveable relative to the first panel between a first position and a second position, wherein a first space is defined adjacent to the first plurality of cable openings with the adjustable plate in the first position and a second space is defined adjacent to the second plurality of openings with the adjustable plate in the second position.

7. A fiber distribution hub as claimed in claim 6, further comprising a swing frame pivotally connected to the cabinet.

8. A fiber distribution hub as claimed in claim 7, wherein the at least one splitter module is disposed on a top portion of the swing frame.

9. A fiber distribution hub as claimed in claim 7, wherein the termination module and the storage module are disposed on the swing frame.

10. A fiber distribution hub as claimed in claim 6, further comprising a splice tray mounted to the adjustable plate.

11. A fiber distribution hub as claimed in claim 10, further comprising a plurality of bend radius protectors disposed on the adjustable plate.

12. A fiber distribution hub as claimed in claim 11, further comprising a cable bracket mounted to the first panel adjacent to one of the second and third panels.

13. A method for installing fiber optic cable in a fiber distribution hub comprising:
   inserting a fiber optic cable through a cable opening defined by a first panel of a cabinet that is adjacent to a second panel of the cabinet, wherein the first panel extends outwardly from the second panel;
   moving an adjustable plate that is disposed on the second panel of the cabinet and selectively moveable relative to the second panel to a first position on the second panel, movement of the adjustable plate to the first position being in a direction away from the cable openings defined by the first panel, wherein the adjustable plate is slidably engaged with the second panel and includes a plurality of slots that is adapted for sliding engagement with pins disposed on the second panel of the cabinet; and
   establishing optical communication between the fiber optic cable and a splitter module disposed in the cabinet.

14. A method for installing fiber optic cable in a fiber distribution hub as claimed in claim 13, further comprising securing the fiber optic cable to the second panel of the cabinet.

15. A method for installing fiber optic cable in a fiber distribution hub as claimed in claim 13, further comprising securing the adjustable plate in the first position.

16. A method for installing fiber optic cable in a fiber distribution hub as claimed in claim 15, wherein a retention member in tight engagement with one of the pins disposed on the second panel secures the adjustable plate in the first position.

* * * * *